H. BÜCHLER.
AUTOMATIC VALVE OR GATE FOR WEIRS OR THE LIKE.
APPLICATION FILED SEPT. 28, 1909.

952,725.

Patented Mar. 22, 1910.

Witnesses.

Inventor.
Hans Büchler

United States Patent Office.

HANS BÜCHLER, OF ZURICH, SWITZERLAND, ASSIGNOR TO STAUWERKE A. G., OF ZURICH, SWITZERLAND.

AUTOMATIC VALVE OR GATE FOR WEIRS OR THE LIKE.

952,725.

Specification of Letters Patent. Patented Mar. 22, 1910.

Application filed September 28, 1909. Serial No. 519,953.

*To all whom it may concern:*

Be it known that I, HANS BÜCHLER, a citizen of the Republic of Switzerland, residing at Schöntalgasse 19, Zurich, Switzerland, have invented certain new and useful Improvements in Automatic Valves or Gates for Weirs or the Like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to automatic valves or gates for weirs or the like and has for its object the structure of such a valve or gate to maintain a delivery of a constant quantity of water from a dominant pool (pond, lake or canal) between maximum and minimum levels.

Figure 1:
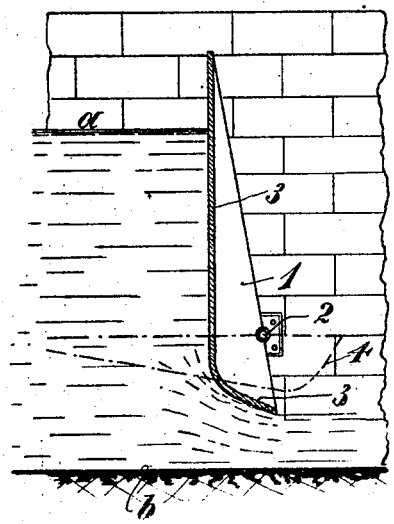
Figure 2:
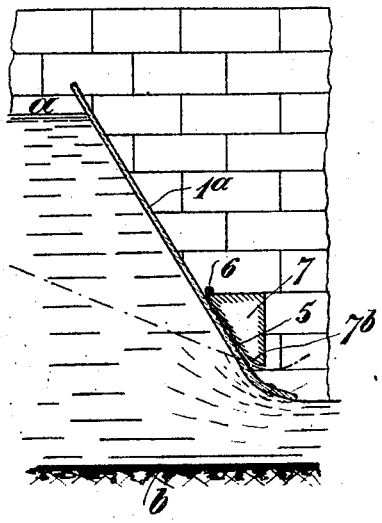
Figure 3:
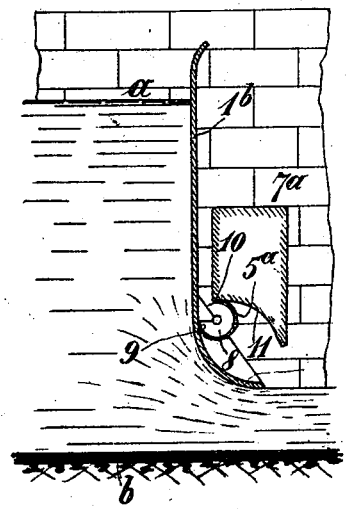
Figure 4:
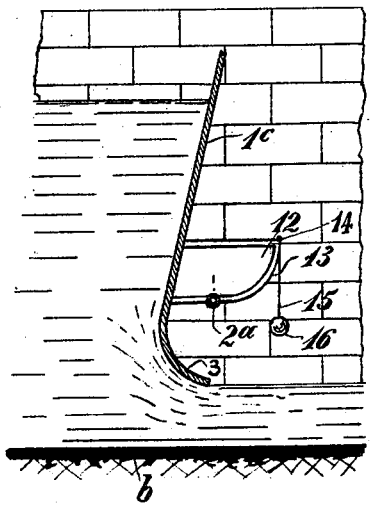

Referring to the drawings in which like parts are similarly designated, Figure 1 is a vertical transverse section of one form of such a valve or gate embodying my invention. Fig. 2 is a similar view of another form. Fig. 3 is a like view of a third form and Fig. 4 is a like view of a fourth form of valve or gate.

Referring more particularly to Fig. 1, $a$ is the upper level of the dominant pool; $b$ the bottom of the dominant pool and race-way, weir or the like. Pivoted above the bottom $b$ of the race-way is the automatically operating valve or gate 1 pivoted at 2 and having a body portion 3 substantially straight on one side of the pivot point 2 and a curved delivery portion 3 on the other side of the pivot point 2. The curvature of the curved delivery portion is such as to conform to the curvature of the water in passing through the orifice or delivery opening between the bottom of the race-way $b$ and the valve or gate 1, and is designed so as to produce as small an amount of contraction as possible. The valve or gate 1 is shown in full lines in its position for maximum, operative, high water level and in its dotted line position 4 of minimum operative low water level in the dominant pool.

The valve or gate is mounted with respect to the weir or race-way so as to always maintain a space between the bottom thereof and the lower end of the valve, in other words the valve only has a throttling effect on a part of the area of the delivery orifice, of the weir or race-way to such a degree as to maintain the quantity of water passing through it constant for under varying hydrostatic pressure due to change of level in the dominant pool. The pivot point 2 is so placed with respect to the valve or gate 1 that the gate remains substantially balanced under all conditions of operation between maximum and minimum levels of the dominant pool.

The operation is such that as soon as the level of the water in the dominant pool sinks the relation of the pressures on the upper and the lower portions of the valve due to hydrostatic and hydronamic pressure will cause the valve to move counter-clockwise. The pressure on that portion of the valve above the pivot point will decrease temporarily to a greater extent than on the lower portion and thereby increase the area of the delivery orifice of the weir or race-way and automatically maintain a quantity of water delivered to the race-way constant and this movement of the valve will continue until the pressures above and below the pivot point become again balanced.

In Fig. 2 I have shown a modification in which the gate or valve $1^a$ is connected by a flexible member 5 to a pivot point 6 on a transverse beam or the like 7 provided with a curved face $7^b$ against which the gate $1^a$ has a shifting pivot.

In Fig. 3, I have shown the valve $1^b$ as provided with a cylinder 8 to which is connected a flexible member $5^a$, one end of which member is connected to the cylinder at 9 and the other end of which is connected at 10 to a cross beam $7^a$ having a curved end face 11 on which the cylinder is capable of rolling when the valve $1^b$ moves counter-clockwise and also forms with the cylinder a shifting pivot.

In Fig. 4 I have shown the valve $1^c$ as pivoted at $2^a$ on an arm 12. The valve or gate is connected to the arm 12 on one side of the pivot point and that portion of the arm 12 which extends on the other side of the pivot point is provided with a curved end 13 to which is connected at 14 a flexible suspending element 15 whose lower end carries a weight 16. The counter-clockwise movement of the valve $1^c$ will cause the weight 16 to swing inward toward the pivot $2^a$ and thereby to shorten the effective length of the level arm of the weight 16, *i. e.* between the pivot point 2ª and the end of the arm 12.

I claim:—

1. In combination with a dominant pool and a race-way leading therefrom, a valve pivoted to move on a horizontal axis, the lower end of the valve at all times distant from the bottom of the race-way and being balanced by the upper portion of the valve under all conditions of operation between maximum and minimum water level of the dominant pool, thereby maintaining the quantity of water flowing past said valve substantially constant at all times.

2. In combination with a dominant pool and a race-way leading therefrom, a valve at all times distant from the bottom of the race-way, a pivot for said valve and the lower end of the valve curved under its axis of rotation in the out-flow direction, thereby maintaining the quantity of water flowing past said valve substantially constant at all times.

3. In combination with a dominant pool and a race-way leading therefrom, a valve at all times distant from the bottom of the race-way, a shifting pivot for said valve, the lower end of which is curved and lies under the shifting pivot in all conditions of operation, thereby maintaining the quantity of water flowing past said valve substantially constant at all times.

4. In combination with a dominant pool and a race-way leading therefrom, a valve pivoted to move on a horizontal axis, the lower end of the valve at all times distant from the bottom of the race-way and being balanced by the upper portion of the valve under all conditions of operation between the maximum and minimum water level of the dominant pool, thereby maintaining the quantity of water flowing past said valve substantially constant at all times and counter-balancing means for the valve.

5. In combination with a dominant pool and a race-way leading therefrom, a valve pivoted to move on a horizontal axis, the lower end of the valve at all times distant from the bottom of the race-way and being balanced by the upper portion of the valve under all conditions of operation between the maximum and minimum water level of the dominant pool, thereby maintaining the quantity of water flowing past said valve substantially constant at all times and counter-balancing means for the valve comprising a weighted lever arm.

In testimony that I claim the foregoing as my invention, I have signed my name in presence of two subscribing witnesses.

HANS BÜCHLER.

Witnesses:
 ERNST TILLMANNS,
 CARL GUBLER.